United States Patent [19]

Margolin

[11] Patent Number: 4,682,794
[45] Date of Patent: Jul. 28, 1987

[54] SECURE IDENTIFICATION CARD AND SYSTEM

[75] Inventor: George D. Margolin, Newport Beach, Calif.

[73] Assignee: Photon Devices, Ltd., Sherman Oaks, Calif.

[21] Appl. No.: 757,385

[22] Filed: Jul. 22, 1985

[51] Int. Cl.⁴ .............................................. B42D 15/00
[52] U.S. Cl. ....................................... 283/82; 283/87; 283/91; 283/107; 283/904
[58] Field of Search .................... 283/85, 87, 91, 107, 283/109, 904, 82

[56] References Cited

U.S. PATENT DOCUMENTS 3,694,285 9/1972 Appel et al. .................... 283/107 X
3,949,501 4/1976 Andrews et al. ...................... 283/82
4,507,550 3/1985 Fleer .................................. 283/82 X Primary Examiner—Paul A. Bell
Attorney, Agent, or Firm—Marmorek, Guttman & Rubenstein

[57] ABSTRACT

A credit card is made with a number of optical fibers sandwiched in the card. Some of the fibers intersect opposite edges of the card in a random fashion and provide a unique code characteristic of the card when light is directed into one edge and detected at the other. When cards are made in quantity, the fiber are added in a random fashion providing a unique code for each card.

3 Claims, 5 Drawing Figures

SECURE IDENTIFICATION CARD AND SYSTEM

FIELD OF THE INVENTION

This invention relates to identification cards of the type used for credit transactions, with automatic teller machines (ATM's) and for access to secure areas and the like.

BACKGROUND OF THE INVENTION

Identification cards, typified by the ubiquitous plastic credit card are wallet-sized, planar plastic cards. Each card of this type bears a magnetic stripe and an area of embossed alphanumeric indications oriented along axes aligned with the long dimension of the card. The magnetic and embossed areas contain customer identification numbers which are sensed when the card is moved through a reader. In some instances, the magnetic stripe includes coded areas which can be incremented and decremented by a reader-writer terminal such as is used with some card-accessed subway systems.

A major problem with these cards is that they can be counterfeited, thus permitting unauthorized persons to use the account fraudulently. Losses due to such unauthorized use now exceed one billion dollars annually in the United States alone. No inexpensive approach is available to insure that a card is not counterfeit.

BRIEF DESCRIPTION OF THE INVENTION

In accordance with the present invention, an identification card includes a relatively large number of optical fibers which have first and second ends, some of which terminate at opposite edges of the card. The fibers are added to the card extruder before a card is made and are purposely added in a random fashion. As a result, each card has a random assortment of fibers which intersect both edges in a unique way.

Each card is tested by passing light into a first edge of the card and by recording the light pattern exiting the opposite edge. The pattern is unique for each card and cannot be duplicated, even by the manufacturer. The card may also include the usual magnetic stripe and embossed code identifying the authorized user.

DETAILED DESCRIPTION

My co-pending application Ser. No. 581,085, filed Feb. 17, 1984, and assigned to the assignee of the present application, discloses a fiber optic system where a bundle of random optical fibers is made coherent electronically. In this connection, the term "coherent" characterizes a bundle of optical fibers in which light exiting a fiber bundle does so in a specified position usually defined by physically positioning the output ends of the fibers in the exact relative positions of the input ends with respect to one another.

Coherence in a bundle of random, physically non-coherent fibers is achieved by passing light sequentially into consecutive fibers at one end of the bundle and by sensing and assigning an address to each consecutively illuminated fiber at the other end of the bundle. If, for example, one end of the bundle is arranged as a linear array, a slit of light is moved along the array illuminating one fiber after the other. The bundled second ends of the fibers are abutted against a light sensitive random access memory (RAM). The light exiting a fiber at the second end is sensed by at least one bit location of the RAM each time light enters a fiber at the linear end. The address of each bit location so illuminated is stored in a programmable read only memory (PROM) to provide a bit map of the relationship (coherence) between signals entering the fibers at the first end and the signals exiting the second end.

In the absence of the bit map, it is clear that light signals exiting the second end of the fibers will make no sense. It is the lack of coherence which is capitalized on in accordance with the present invention. That is to say, a plastic credit card, appearing to be entirely conventional, includes within it a random assortment of plastic optical fibers, some of which intersect opposite edges of the card so that light entering the fiber at one edge generates at the opposite edge a unique optical pattern depending on the unique pattern of fibers. A relatively large number of fibers is used and the arrangement of fibers is entirely random. Consequently, no two cards can purposely be made alike.

Figure 1:
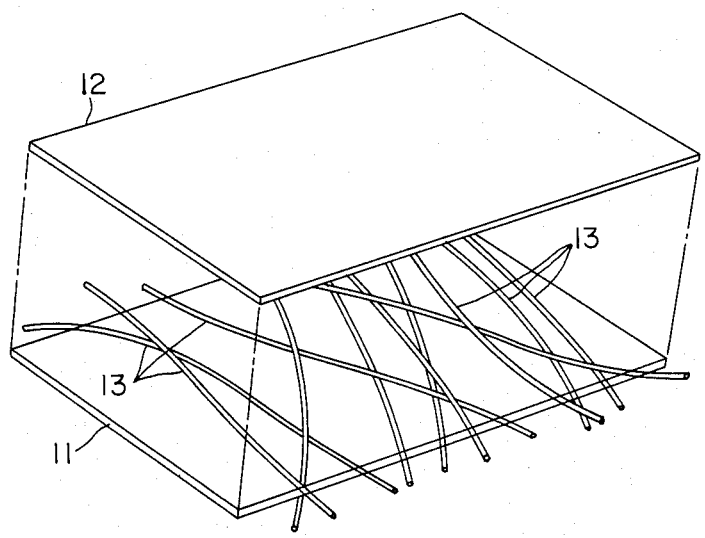
FIG. 1 is a projection view showing, exploded, the components of a card in accordance with the principles of this invention.

FIG. 1 shows an exploded view of the components of a credit card in a pre-manufactured state. Two planes (11 and 12) of flexible, but dimensionally stable material are compressed to sandwich a jumble of optical fibers represented by curved strands 13.

Figure 2:
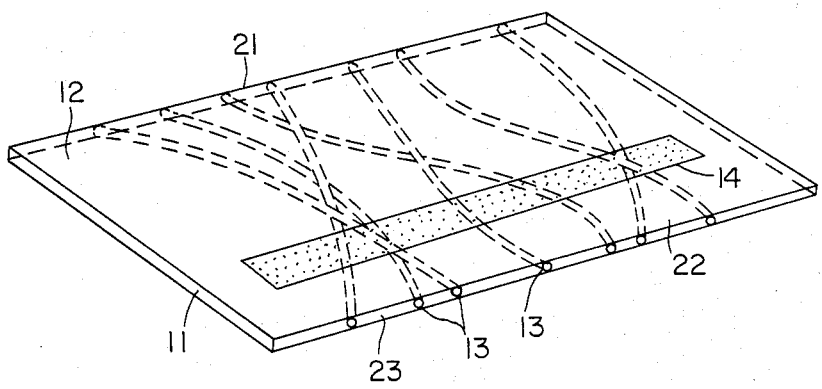
FIG. 2 is a projection view of a card of the type shown in FIG. 1 indicating the exit end of embedded fiber at a detection edge.

FIG. 2 shows the assemblage in a compressed or finished state with a magnetic stripe indicated at 14.

Figure 3:
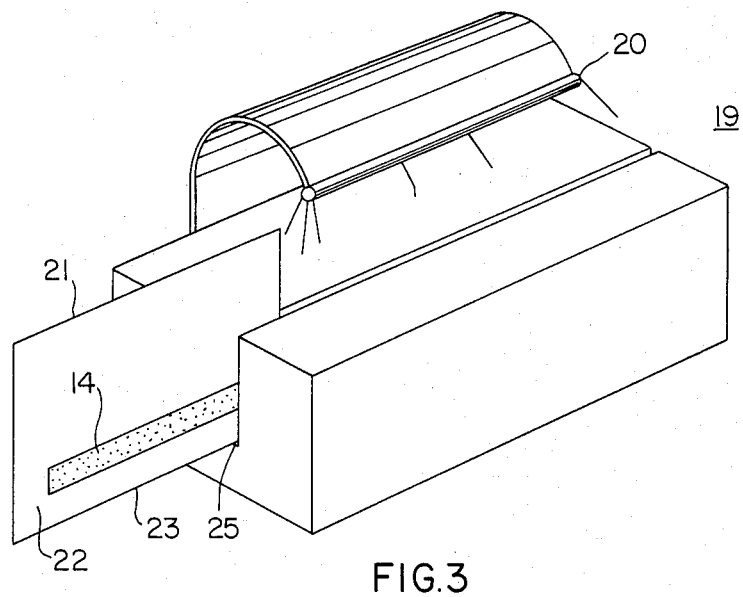
FIG. 3 is a projection view of a card reader adapted for reading the card of the type shown in FIGS. 1 and 2.

FIG. 3 shows a conventional magnetic stripe reader 19 with the addition of lamp 20 which directs light at edge 21 of card 22. The light exits at edge 23 and reader 19 includes photocells embedded in the wear plate 25 of the reader against which card 22 is moved.

Figure 4:
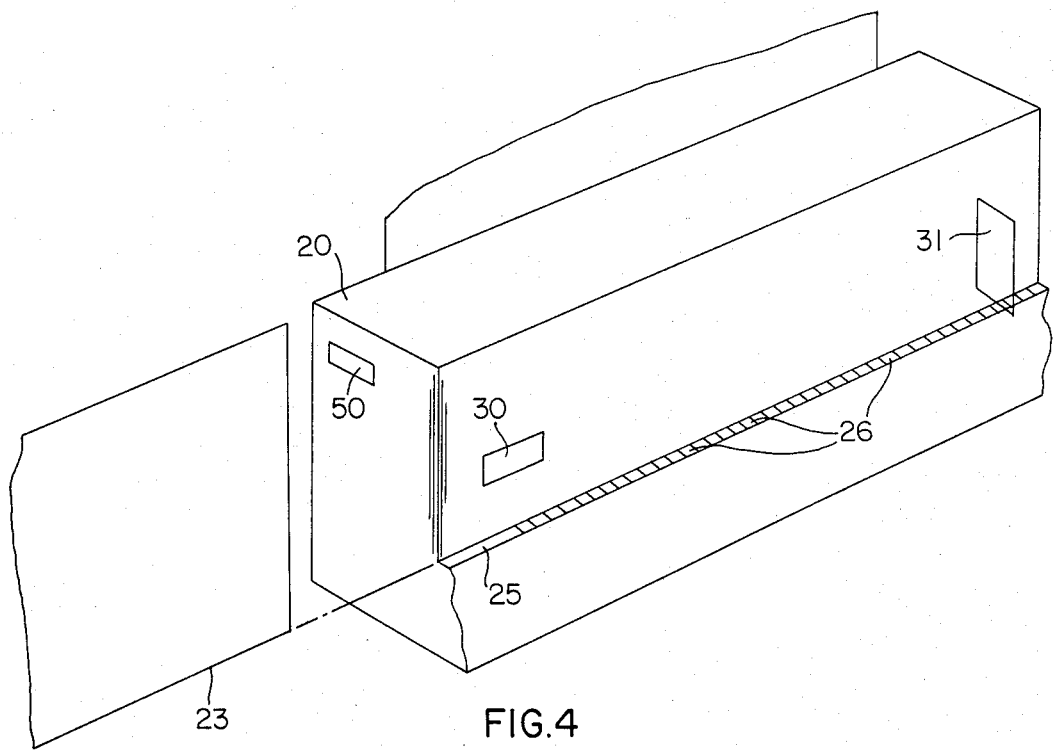
FIG. 4 is a projection view of the reader of FIG. 3, cut away to show sensing apparatus for the card of FIGS. 1 and 2.

FIG. 4 shows a projection view, partially cut away, of reader 19. Photocells 26 are shown positioned to align with edge 23. A card is moved along wear plate 25 in a manner to have the identification code in magnetic stripe 14 read by magnetic head 20 in a conventional manner. When the card is fully seated and read, card stop 31 is contacted by the card and is operative to trigger lamp 20. Photocells 26 also are activated at this time. The pattern (card code) detected by the photocells is characteristic of the card bearing the identification assigned to a particular user at the time of use. A code identifying the authorized user is stored along with the card code in a central processor and in a magnetic stripe and/or embossed area on the card.

At each subsequent use, the authenticity of the card is checked with respect to the card code. For example, upon each use, a credit card is being moved into reader 19 and head 30 senses the magnetic identification code in stripe 14. When the card is fully inserted, photosensors 26 detect the card code. A dial-up connection to a central processor storing card codes at addresses representing the identification codes, apply a "called-up"

card code associated with the ostensibly proper identification code. If the actual card code matches the proper stored card code, an authorization signal is issued and the transaction can be processed.

Figure 5:
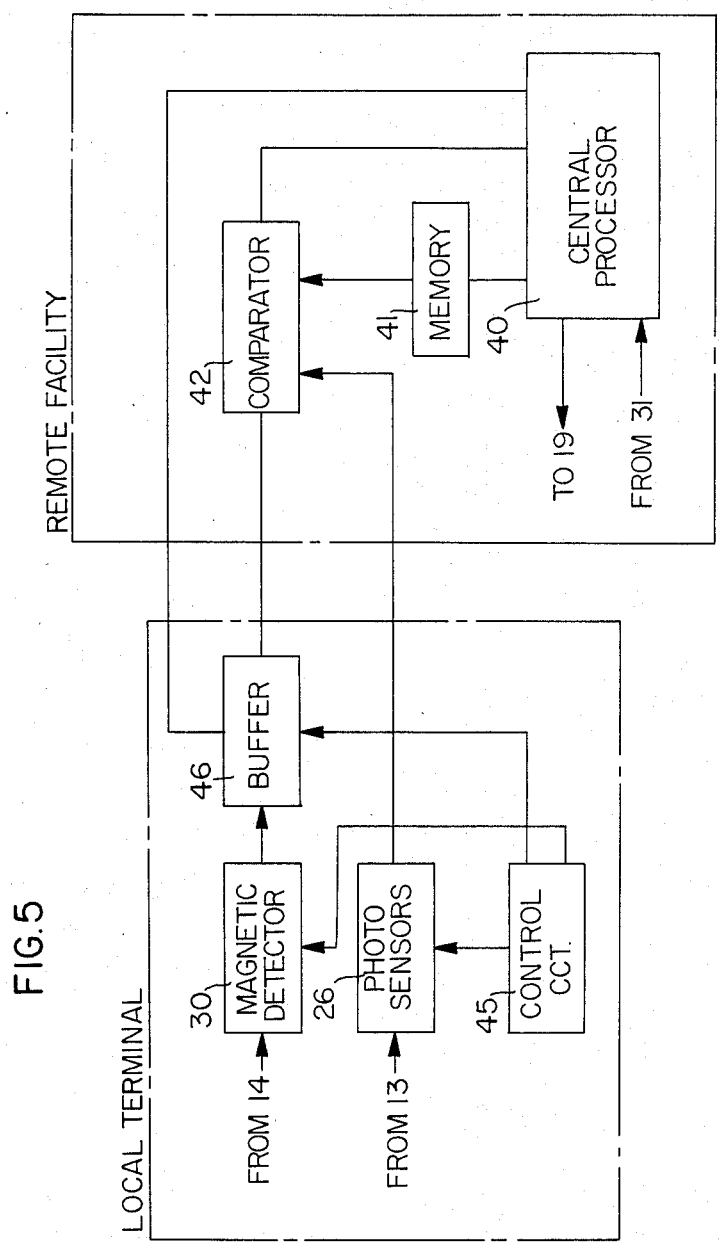
FIG. 5 is a block diagram of the system in which the card of FIGS. 1 and 2 is used.

FIG. 5 shows a block diagram of an electronic system organization for implementing the above operation. Reader 19 conveniently includes a familiar modem (not shown) and is adapted to dial up a central processor represented by block 40. The central processor controls memory 41 and comparator 42 which are assumed to be located remote from terminal 19. Terminal 19 includes a local control circuit 45 and a buffer 46 for storing the identification code sensed by head 30 of FIG. 4 as the card is inserted. When the card stops, it activates (switch) 31 considered to be included in control circuit 45. The switch, in turn, activates photosensors 26 and signals central processor 40.

Central processor 40 responds to process the request for authentication. Processor 40 accepts the identification code and interrogates memory 41 for the card code stored at the address associated with that code. Conveniently, the identification code can be the address at which the associated code is stored. Thus, the applied identification codes results in memory 41 applying the "called-up" card code to comparator 42. Buffer 46 simultaneously applies the identification code detected by detector 30 to comparator 42. If a match occurs, an authentication signal is sent to the originating terminal, for example, to illuminate lamp 50 of FIG. 4 indicating transaction approval.

One convenient method for making a credit card of the type disclosed herein is analogous to the common "filled plastic" technique where plastic is mixed with chopped fiberglass to provide structural strength.

In our case, the large plastic sheets are placed in opposition and the area between the sheets is filled with randomly oriented optical fibers. The fibers are supplied at random and typically have lengths of about three times the width of a card. The composite is fed into an extruder at a temperature, which is typical of such operation. Each card serves as a blank and is then cut to size preparatory to having the customary printed magnetic stripe, and embossing applied.

The card appears to be entirely conventional. The fibers are not conspicuous in any way. Nor can the positions of the fibers be duplicated. Each card can include hundreds or thousands of fibers, if desired. The fibers are less than the diameter of a human hair. Some fibers do not intersect any edge of the card, others both edges, others only the input edge, others only the output edge. The chances for two sets to give the same light pattern when illuminated can be one in trillions at essentially no cost.

Yet, detection is relatively inexpensive to achieve also. The reader need only include a low cost lamp; it can be triggered by the seating of the card in its fully inserted position. Of course, this can be read just like a magnetic stripe—while on the move—timing can come from the magnetic stripe reader. The photosensors also need only sense relatively few of the fibers. These photocells, moreover, can be adjusted with respect to the card to sense different subsets of the fibers so that sections of the cards can be "don't care" sections.

The "don't care" sections need not include only random fibers. A multistrand preformed set of fibers can be placed in a card for providing an optical signature for a particular credit plan. That code, for example, can even be used to dial up the telephone number of that plan during a credit check. Consequently, the card can be used as a universal card with each plan having a segment of the photosensors pre-organized to sense the plan signature.

What is claimed is:

1. An identification card comprising an essentially planar member having first and second edges, said member including a plurality of optical fibers at least some of which have first and second ends which intersect said first and second edges respectively at random.

2. An identification card in accordance with claim 1 wherein said member is rectangular in shape and includes at least a first area aligned parallel to said first and second edges and including a plurality of coded indications.

3. An identification card in accordance with claim 1 wherein said first area comprises a magnetic stripe.

* * * * *